Oct. 11, 1938.   A. KRUEGER   2,132,691
SHEAVE
Filed Jan. 22, 1937

Inventor
August Krueger
By C. A. Snow & Co.
Attorneys.

Patented Oct. 11, 1938

2,132,691

UNITED STATES PATENT OFFICE 2,132,691

SHEAVE

August Krueger, Manitowoc, Wis.

Application January 22, 1937, Serial No. 121,886

1 Claim. (Cl. 64—30)

This invention relates to a sheave or pulley and while it is designed more especially for use in connection with oil well equipment and the like, it can be employed to advantage wherever the sheave or pulley is used for supporting a cable which starts and stops abruptly while in operation.

It has been found in practice that where a cable is started or stopped abruptly, a drag is set up upon the cable with the result that it soon becomes worn to such an extent as to be unfit for further use. This is true particularly in structures wherein the cable-actuated pulley is used for transmitting power and thus is subjected to resistance when started.

An object of the present invention is to provide a sheave or pulley the marginal or cable engaging portion of which is mounted to rotate relative to the hub portion so that when the cable or rope suddenly starts to move, this rotatable portion of the sheave will move with it. In well drilling equipment this operation will result in a gradual pickup of the sheave due to the frictional contact between the ring and hub portion of the sheave and will also reduce side whipping of the rope or cable.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

In the accompanying drawing the preferred form of the invention has been shown.

In said drawing

Figure 1:
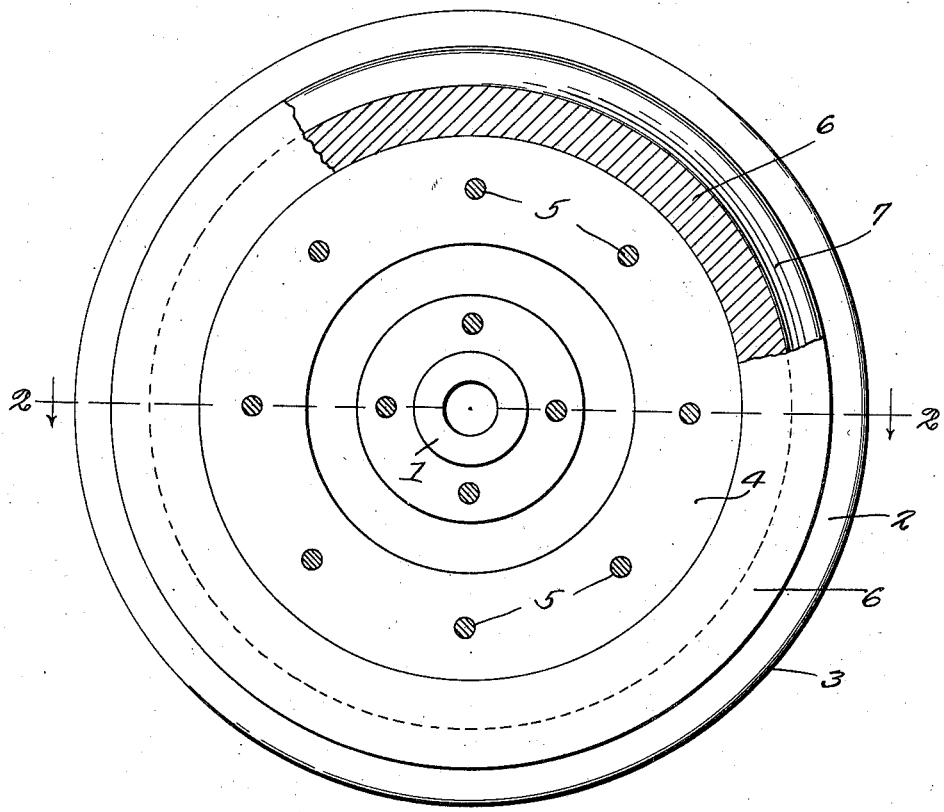
Figure 1 is a side elevation, partly in section, of a sheave constructed in accordance with the present invention.
Figure 2:
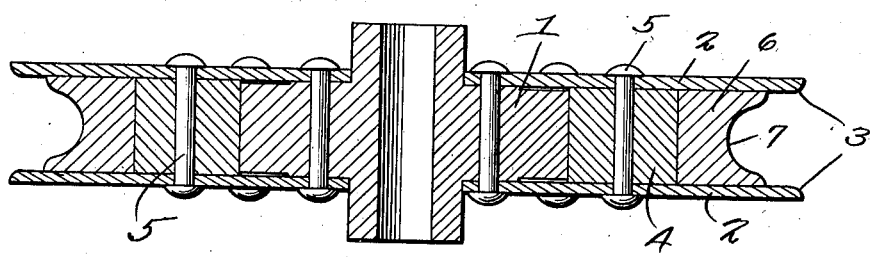
Figure 2 is a section on line 2—2, Figure 1.

Referring to the figures by characters of reference 1 designates the hub portion of the sheave formed of any suitable material and interposed between and secured to side plates 2 which are circular and the outer margins of which are preferably rounded as shown at 3.

Fitted on and extending snugly around the hub is an inner ring 4 likewise formed of any suitable material and preferably fixedly joined to the plates 2 by rivets 5 or the like. This inner ring constitutes a bearing and a centering means for the outer ring 6 which is fitted between the plates 2 and has an annular groove 7 in its outer periphery proportioned to receive the cable or rope to be used with the sheave or pulley. The marginal portions of the plates 2 extend beyond the ring 6 and cooperate therewith to retain the cable or rope when in engagement with the sheave or pulley.

In practice when a cable or rope on the sheave or pulley is suddenly pulled in one direction, the frictional contact thereby with the ring 6 will cause said ring to rotate on the ring 4. There will of course be a frictional contact between the two rings and this contact will increase in proportion to the load transmitted to ring 6 from the cable. Consequently the rotating ring 6 will gradually pick up the inner ring until ultimately the entire sheave rotates as one body. Thus the pulley can be used as a power transmitting means for driving any rotatable shaft to which it may be secured.

Obviously by providing a sheave or pulley as herein described, wear upon the cable or rope due to sliding contact is eliminated and replacements are reduced materially.

What is claimed is:

A sheave or pulley including a hub, an inner ring thereon and concentric therewith, an outer ring on the inner ring concentric therewith, said hub, inner ring and outer ring having flush side faces and said outer ring having an annular groove in its periphery, side plates fixedly secured to the flush surfaces of the hub and inner ring and movably engaged by the corresponding surfaces of the outer ring, said plates being parallel and said outer ring being mounted for rotation between the plates and upon the inner ring and said inner ring constituting means for transmitting thrust from the outer ring to the hub, and fastening means extending transversely through the plates, hub and inner ring for holding them fixed relative to each other, said means being exposed at the sides of the plates.

AUGUST KRUEGER.